United States Patent
Eccardt et al.

(10) Patent No.: US 6,502,493 B1
(45) Date of Patent: Jan. 7, 2003

(54) TABLE SAW BLADE HEEL ADJUSTER

(75) Inventors: Curtis J. Eccardt, Defiance, MO (US); Jason E. Hill, University City, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/892,584

(22) Filed: Jun. 27, 2001

(51) Int. Cl.$^7$ .............................. B26D 5/08; B23D 33/02
(52) U.S. Cl. ......................... 83/473; 83/477.2; 83/581
(58) Field of Search ............................. 83/477.1, 477.2, 83/473, 581, 477, 508.2, 471.3

(56) References Cited

U.S. PATENT DOCUMENTS

| | | | | |
|---|---|---|---|---|
| 2,844,173 A | * | 7/1958 | Gaskell | 83/477.1 |
| 4,270,427 A | * | 6/1981 | Colberg et al. | 83/473 |
| 4,384,621 A | * | 5/1983 | Bitzel | 144/126 |
| 5,158,001 A | * | 10/1992 | Udelhofen et al. | 144/252.2 |
| 5,404,779 A | * | 4/1995 | Break | 83/471.3 |
| 5,862,734 A | * | 1/1999 | Brunson et al. | 83/471.3 |
| 5,875,698 A | * | 3/1999 | Ceroll et al. | 144/286.5 |
| 5,931,073 A | * | 8/1999 | Hoyer-Ellefsen | 83/471.3 |
| 6,195,905 B1 | * | 3/2001 | Cole | 29/401.1 |

FOREIGN PATENT DOCUMENTS

| | | | | |
|---|---|---|---|---|
| CA | 614230 | * | 2/1961 | 83/477.1 |
| DE | 28 11 615 A 1 | * | 9/1979 | 83/477.1 |
| IT | 601170 | * | 12/1959 | 83/477.1 |
| JP | 5225 | * | 1/1980 | 83/477.1 |

* cited by examiner

*Primary Examiner*—M. Rachuba
*Assistant Examiner*—Jason Prone
(74) *Attorney, Agent, or Firm*—Howrey Simon Arnold & White

(57) ABSTRACT

A table saw includes a work support table that defines a blade slot therethrough and at least one guide groove oriented generally parallel to the slot. A pair of trunnions are attached to the lower surface of the work support table, with at least one of the trunnions defining an adjustment opening having opposing sides. A cradle assembly has a blade mounted therein driven by a motor, and it is supported by the trunnions such that at least a portion of the blade extends through the slot in the work support surface. To provide adjustment of the blade heel, an adjustment member is received by the adjustment opening in the trunnion and is rotatably attached to the lower surface of the work support table. Rotation of the adjustment member causes the adjustment member to contact one of the opposing sides of the adjustment opening, thus moving the trunnion to adjust the position of the blade relative to the guide groove.

20 Claims, 3 Drawing Sheets

TABLE SAW BLADE HEEL ADJUSTER

BACKGROUND OF THE INVENTION

1. Field of the Invention

The present invention relates generally to a device for adjustment of a trunnion, and more particularly relates to a device to adjust the heel of a table saw blade.

2. Description of Related Art

Various table saws for woodworking and the like are known and commercially available. A typical bench or floor-model table saw consists of a main chassis supporting a substantially flat, stationary work surface. The work surface is provided with a slot for the saw blade and at least one guide groove in the top of the work surface. The groove(s) are substantially parallel to the slot. The saw blade is mounted on a blade arbor so that it partially extends through the slot in the work surface. The blade arbor is part of a motor assembly mounted to a cradle under the work surface.

The spindles that support the cradle in most modem table saws are pivotally is mounted between a pair of trunnions attached to the bottom of the work surface. One trunnion is fastened toward the front of the work surface, while the other trunnion is fastened toward the rear of the work surface. The trunnions allow the cradle to be tilted relative to the work surface by means of a hand crank. The operator is able by use of the crank, to produce cuts that are not necessarily at a right angle to the work surface. Also, modern table saws allow the operator to raise or lower the blade within the slot by means of another hand crank.

It is crucial that the blade arbor be at a substantial right angle to the guide groove in the work surface. In other words, the saw blade must be substantially parallel with the guide groove for accurate cutting. The orientation of the blade arbor to the guide groove is characterized as the heel of the table saw blade. Unfortunately, known means of blade heel adjustment are generally unsatisfactory. Each trunnion is typically fastened to the bottom of the work surface by stationary bolts that extend through oversized or slotted bolt holes in the trunnion. This enables one trunnion to be moved laterally a small amount relative to the other trunnion to correct misalignment of the blade arbor relative to the guide groove in the work surface when necessary. Thus, with known table saws, if the cutting blade is not parallel with the guide groove the bolts that fasten one trunnion to the supporting table are loosened. The trunnion and the cradle that it supports are then be forced or pried to change the heel of the saw blade, often using crude means such as striking the trunnion with a hammer.

Another known means of adjusting the heel of the saw blade involves the use of set screws placed on either side of the stationary bolts. The set screws may be loosened or tightened to move the trunnion and cradle. This form of adjustment requires expensive secondary machining to the trunnion, not to mention involved execution of the adjustment procedure.

The adjustment device proposed according to the present invention addresses these and other difficulties when adjusting a trunnion. In particular, the present invention provides an inexpensive and direct solution to adjusting the heel of a saw blade relative to the guide grooves on the work surface.

SUMMARY OF THE INVENTION

In accordance with aspects of the present invention, a table saw includes a work support table that defines a blade slot therethrough and at least one guide groove oriented generally parallel to the slot. A pair of trunnions are attached to the lower surface of the work support table, with at least one of the trunnions defining an adjustment opening having opposing sides. A cradle assembly has a blade mounted therein driven by a motor, and it is supported by the trunnions such that at least a portion of the blade extends through the slot in the work support surface. An adjustment member is received by the adjustment opening in the trunnion and is rotatably attached to the lower surface of the work support table. Rotation of the adjustment member causes the adjustment member to contact one of the opposing sides of the adjustment opening, thus moving the trunnion to adjust the position of the blade relative to the guide groove. This allows a user of the table saw to more easily position the blade parallel to the guide groove to insure proper operation of the table saw.

In exemplary embodiments of the invention, the adjustment member includes a generally cylindrical adjustment end that defines an off-center bore extending therethrough to form an eccentric. A second end that defines a bolt end or an adjustment handle is coupled to the eccentric to allow a user to easily rotate the eccentric adjustment end. The adjustment opening may define a variety of shapes; for example, the opening may be oval-shaped or U-shaped.

BRIEF DESCRIPTION OF THE DRAWINGS

Other objects and advantages of the invention will become apparent upon reading the following detailed description and upon reference to the drawings in which.

Figure 1A:
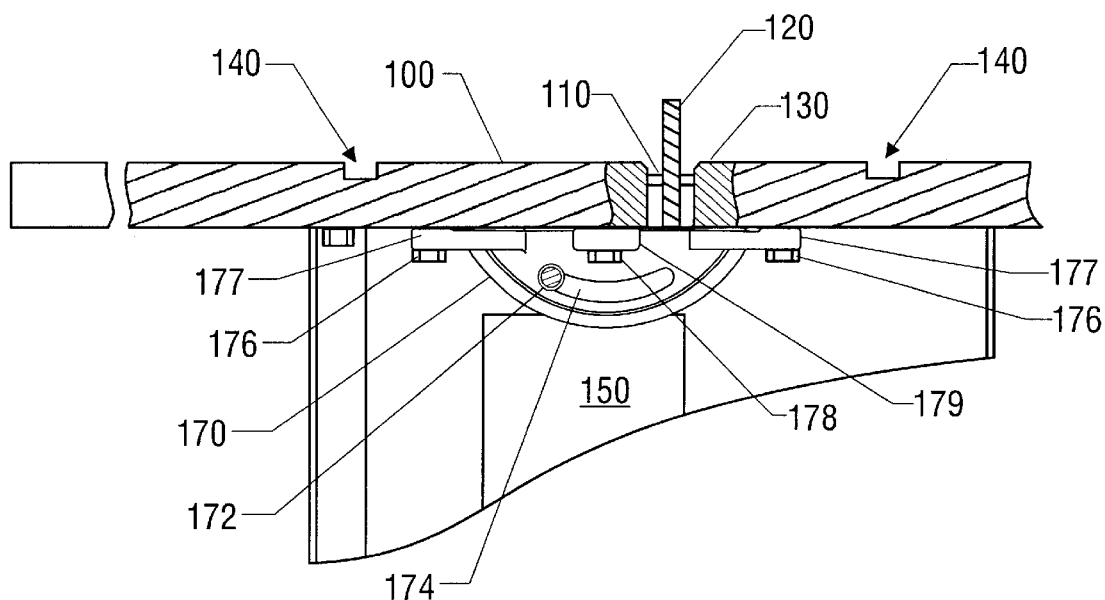
FIG. 1A is a simplified end view, partially in section, of a table saw in accordance with embodiments of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1A, a portion of an exposed table saw is depicted. The table saw has a work support surface 100 that defines a slot 110. A blade 120 projects through the slot 110 in order to cut work pieces on the work surface 100. The blade 120, which is driven in a conventional manner, is supported by a cradle assembly 150 attached to the bottom of the work support surface 100 by a pair of trunnions 170. The cradle assembly 150 includes a blade arbor 130 that allows for the blade 120 to rotate within the slot 110. Parallel to the slot 110 lies a guide groove 140 in the work surface 100. A typical table saw will have one or two guide grooves 140. It is essential that the guide grooves 140 be substantially parallel to the blade 120 to produce proper cuts using the table saw. Therefore, the blade arbor 130 must be kept perpendicular to the guide groove 140.

The blade arbor 130 is movable within the blade slot 110 by means of the cradle 150. The cradle 150 holds a motor assembly (not shown), the blade arbor 130, the blade 120 and other apparatus for the operation of the table saw. In certain embodiments, the blade 120 can be tilted to produce angled cuts by use of a tilting crank (not shown). When turning the crank, the blade 120 is angled in reference to the flat work surface 100.

Figure 1B:
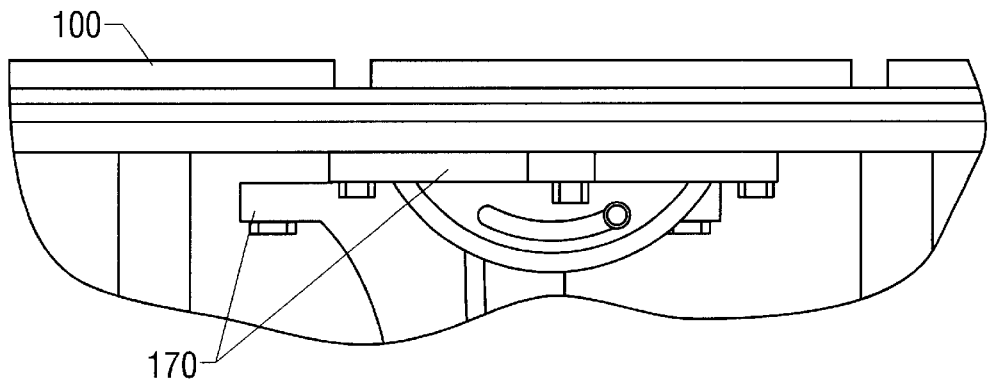
FIG. 1B schematically illustrates exemplary positions of trunnions supporting a cradle assembly of the table saw shown in FIG. 1A.
Figure 2:
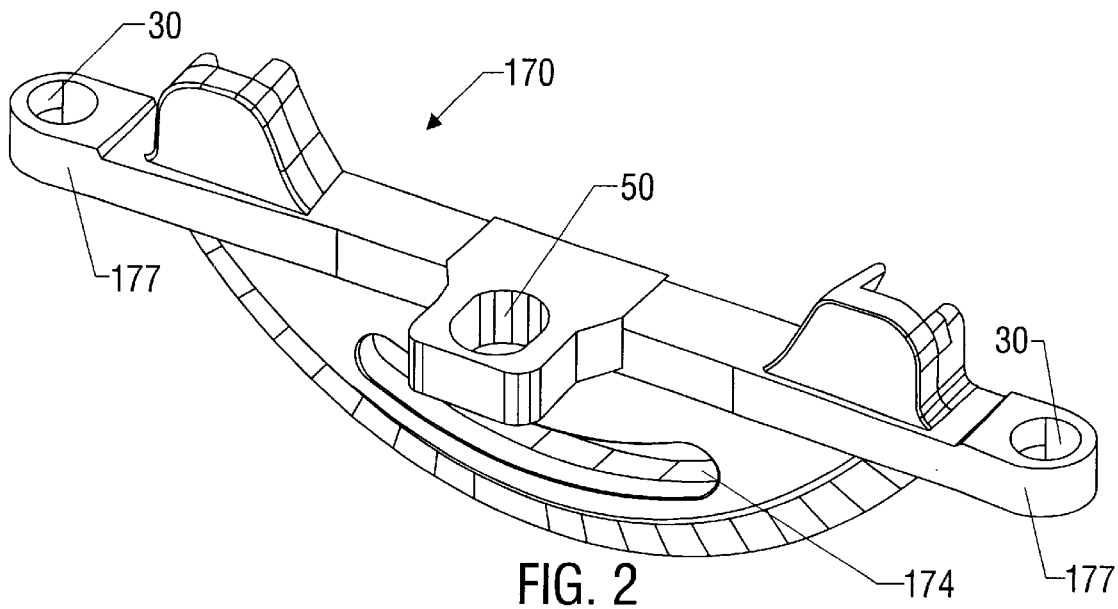
FIG. 2 is a perspective view of a trunnion in accordance with the present invention.
Figure 3A:
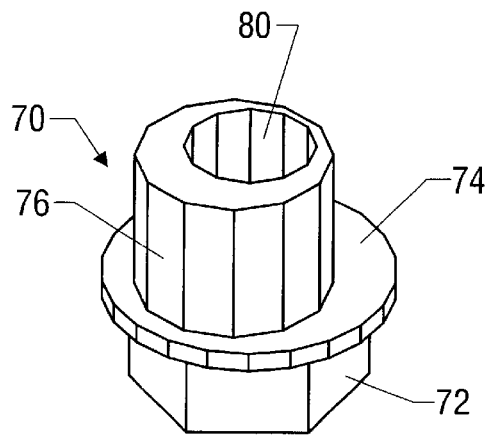
FIGS. 3A–3D illustrate various views of an adjustment member in accordance with the present invention.
Figure 3B:
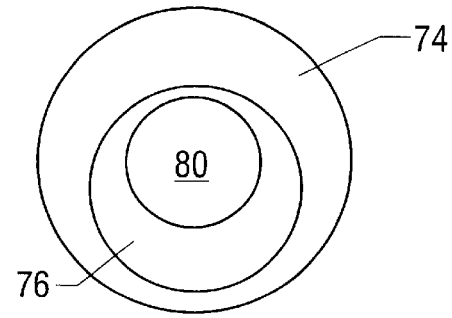
Figure 3C:
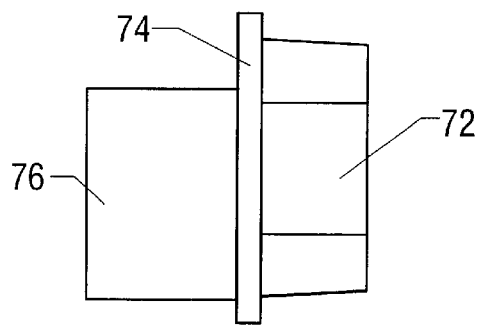
Figure 3D:
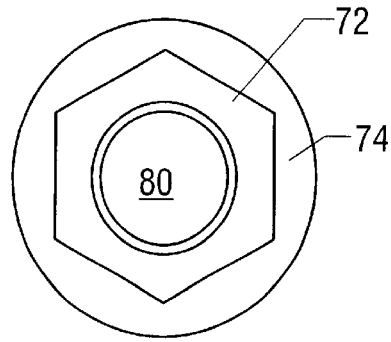

In FIG. 1A, one trunnion 170 is visible. FIG. 1B schematically shows the position of two trunnions 170. To support the cradle 150 below the work surface 100, the trunnions 170 are positioned on either side of the cradle 150. An exemplary trunnion 170 in accordance with the present invention is illustrated in FIG. 2. Referring to FIGS. 1 and 2, the illustrated trunnion 170 defines a spindle slot 174 for holding a spindle 172 of the cradle 150. The spindle slot 174 allows the cradle 150 to be tilted relative to the work support table 100 to move the blade 120 to an angled position. Bolts 176 attach the trunnion 170 to the bottom of the work surface 100. The bolts 176 are installed through oversized slots 30 (shown in FIG. 2) in side flanges 177 of the trunnion 170. The trunnion 170 further includes a central flange 179 through which an adjustment member 70 extends and attaches to the bottom of the work support table 100. The central flange 179 contains an adjustment opening 50, which in the exemplary embodiment shown in FIG. 2, comprises an oblong slot extending through the flange 179.

FIGS. 3A–3D illustrate an adjustment member 70 that is received by the adjustment opening 50 in the trunnion 170. The adjustment member 70 is attached to the bottom of the work surface 100 such that it is rotatable about an off-center position to form an eccentric. In the embodiment illustrated in FIG. 3, the adjustment member 70 defines a bore 80 extending therethrough. A bolt or other shaft extends through the bore 80 to attach the adjustment member 70 to the bottom of the work surface 100 so that the adjustment member 70 is rotatable about the bolt.

The particular adjustment member 70 shown in FIG. 3 includes a generally cylindrical end 76 having the bore 80 extending through the cylindrical end 76 at an off-center location. As best seen in FIG. 3B, while the bore 80 is located at an off-center position relative to the cylindrical eccentric end 76, the bore 80 is generally centered relative to the flange 74 and bolt end 72. In one exemplary embodiment, the cylinder 76 defines a diameter of about 0.880 inches, the bore 80 defines a diameter of about 0.375 inches, and the center of the bore 80 is off-set about 0.075 inches from the center of the cylinder 76. The eccentric end 76 of the adjuster 70 is received by the adjustment opening 50. The illustrated adjustment member 70 further includes a bolt end 72 separated from the eccentric end 76 by a flange 74. As shown in FIG. 3, the bolt end may comprise a standard hex-head, though a square-head or any other shape that lends itself to easy rotation is suitable.

Figure 4:
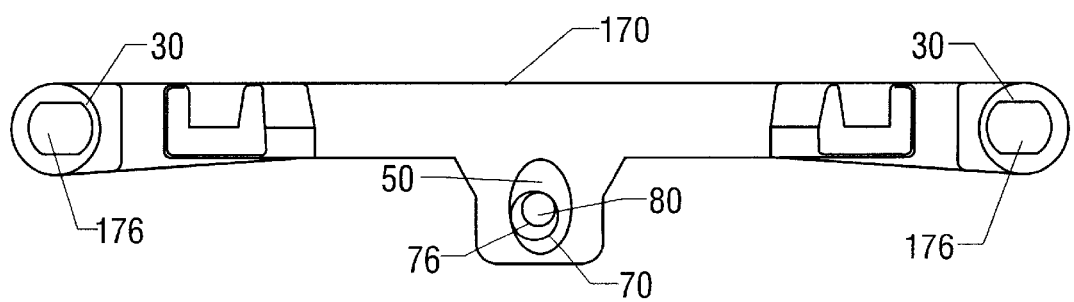
FIG. 4 is a top view of the trunnion and adjustment member shown in FIGS. 2 and 3, conceptually illustrating operation of the adjustment system of the present invention.

FIG. 4 conceptually illustrates operation of the blade heel adjustment system described herein. When the adjustment member 70 is received by the adjustment opening 50, the bolt end 72 (not shown in FIG. 4) extends outside the adjustment opening 50 and is easily turned by use of a common tool such as a wrench to rotate the eccentric end 76. Rotation of the eccentric adjustment member 70 in one direction causes the eccentric end 76 to contact one of the opposing sides of the adjustment opening 50 of the trunnion 170, while rotation in the other direction causes the eccentric end 76 to contact the other side of the adjustment opening 50. The contact between the eccentric end 76 and the side of the adjustment opening results in lateral movement of the trunnion 170 to adjust the blade heel as desired.

Figure 5:
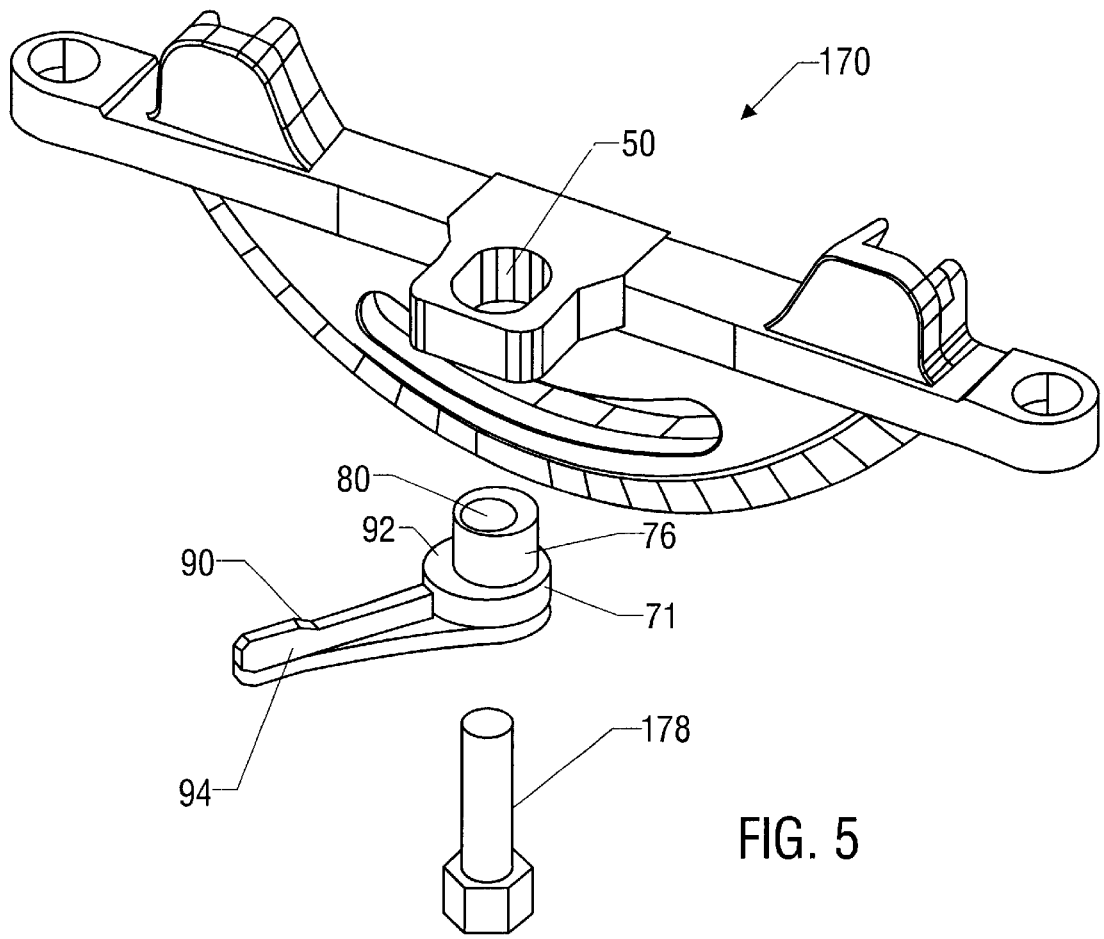
FIGS. 5 and 6 are perspective views illustrating alternative embodiments of the trunnion and adjustment member of the present invention.
Figure 6:
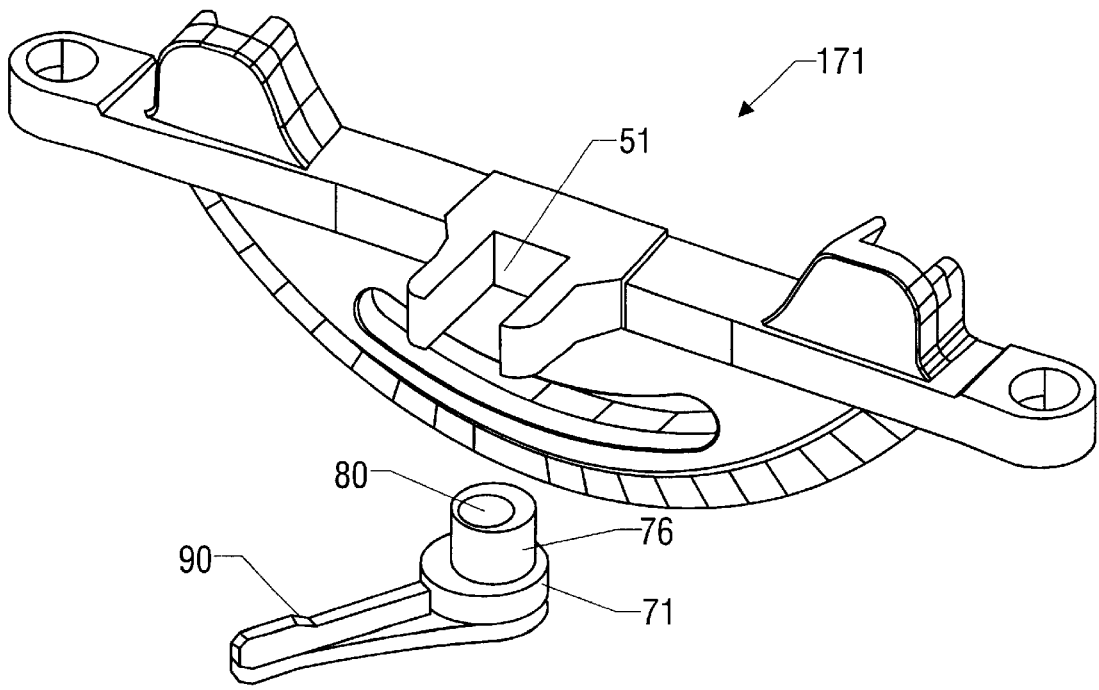

FIGS. 5 and 6 illustrate blade heel adjustment systems in accordance with alternative embodiments of the invention. In the system shown in FIG. 5, an adjustment handle is attached to the eccentric end 76 of the adjustment member 71. The adjustment system of FIG. 5 includes the trunnion 170 shown in FIG. 2, including the oblong adjustment opening 50. An adjustment member 71 has an eccentric end 76 that has an off-center bore 80 extending therethrough. An adjustment handle 90 replaces the bolt end 72 of the adjustment member 70 shown in FIG. 3. The adjustment handle 90 includes a generally cylindrical portion 92 coupled to the eccentric end 76 with a handle portion 94 extending from the cylindrical portion 92. The bore 80 is generally centered in the cylindrical portion 92 of the adjustment handle 90. A bolt 178 extends through the bore 80 to attach the adjustment member 71 to the bottom of the work support table 100, and the adjustment member is rotatable about the bolt 178.

As will be appreciated by one skilled in the art having the benefit of this disclosure, the adjustment opening in the trunnion may have any number of different shapes. FIG. 6 illustrates an alternative trunnion 171, which includes a generally U-shaped adjustment opening 51 having an open end. The trunnion 171 is shown with the adjustment member 71, though the adjustment member 70 described in conjunction with FIG. 3 could also be used with the trunnion 171. The trunnion 171 functions in the same manner as the trunnion 170 shown in FIG. 4, wherein the eccentric end 76 of the adjustment member 70 or 71 is received in the opening 51 such that rotation of the adjustment member 70 or 71 results in the eccentric end 76 contacting one or the other side of the opening 52 to laterally move the trunnion 171.

The eccentric end 76 either has a shape that is geometrically located off center or has a shape that is not otherwise customarily found on a conventional bolt. Of course, the eccentric end 76 can have a variety of shapes beyond a simple cylinder as shown in FIG. 3. For example, the eccentric end 76 may be in the shape of an oval or have another abnormal shape. If the end 76 is oval-shaped, for example, it may not be necessary to rotate the adjustment member 70 about an off-center location. A cylindrical end as depicted may require less machining or casting to produce than an alternative shapes.

As noted above, a pair of trunnions 170 usually attach the cradle assembly 150 to the bottom of the work support table 100. In certain embodiments of the invention, the rear trunnion 170 is provided with the adjustment opening 50 or 51 for cooperation with the adjustment member 70 or 71, as the rear trunnion generally offers easier access for an operator to adjust the heel of the saw blade. However, either the front or rear trunnion, or both trunnions, may be adjustable in accordance with the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A table saw blade heel adjustment system, comprising:
   a trunnion for supporting a table saw blade assembly relative to a work surface, the trunnion defining an adjustment opening extending therethrough, the adjustment opening defining generally opposing sides; and
   an eccentric adjustment member received by the adjustment opening;
   such that rotation of the eccentric member displaces the trunnion relative to the work surface, resulting in movement of the supported table saw blade assembly.

2. The table saw blade heel adjustment system of claim 1, wherein the eccentric adjustment member includes a first end defining an off-center bore extending therethrough.

3. The table saw blade heel adjustment system of claim 2, further comprising a shaft extending through the off-center bore such that the eccentric adjustment member is rotatable about the shaft.

4. The table saw blade heel adjustment system of claim 2, wherein the eccentric adjustment member includes a second end, and wherein the off-center bore extending through the first end also extends through the center of the second end.

5. The table saw blade heel adjustment system of claim 4, wherein the first and second ends are separated by a flange.

6. The table saw blade heel adjustment system of claim 2, wherein the eccentric adjustment member includes a second end coupled to the first end, the second end defining a bolt end.

7. The table saw blade heel adjustment system of claim 2, wherein the eccentric adjustment member includes a second end coupled to the first end, the second end defining an adjustment handle.

8. The table saw blade heel adjustment system of claim 1, wherein the adjustment opening is generally oval-shaped.

9. The table saw blade heel adjustment system of claim 1, wherein the adjustment opening is generally U-shaped.

10. A table saw, comprising:
    a work support table having upper and lower surfaces, the work support table defining a slot therethrough, the upper surface defining at least one guide groove oriented generally parallel to the slot;
    a pair of trunnions attached to the lower surface of the work support table, at least one of the trunnions defining an adjustment opening having opposing sides;
    a cradle assembly having a blade mounted therein, the cradle assembly being supported by the trunnions such that at least a portion of the blade extends through the slot in the work support surface; and
    an adjustment member received by the adjustment opening in the trunnion, the adjustment member being rotatably attached to the lower surface of the work support table;
    such that rotation of the adjustment member causes the adjustment member to contact one of the opposing sides of the adjustment opening, thus moving the trunnion and the cradle assembly supported thereby to adjust the position of the blade relative to the guide groove.

11. The table saw of claim 10, wherein the adjustment member includes a first end received by the adjustment opening, the first end defining an off-center bore extending therethrough.

12. The table saw of claim 11, further comprising a shaft extending through the off-center bore, the shaft being attached to the work support table such that the adjustment member is rotatable about the shaft.

13. The table saw of claim 10, wherein the trunnion defines first and second side flanges, each flange defining a slot therethrough; wherein bolts extend through the slots to attach the trunnion to the lower surface of the work support table.

14. The table saw of claim 11, wherein the adjustment member includes a second end, and wherein the off-center bore extending through the first end also extends through the center of the second end.

15. The table saw of claim 14, wherein the first and second ends are separated by a flange.

16. The table saw of claim 11, wherein the adjustment member includes a second end coupled to the first end, the second end defining a bolt end.

17. The table saw of claim 11, wherein the adjustment member includes a second end coupled to the first end, the second end defining an adjustment handle.

18. The table saw of claim 10, wherein the adjustment opening is generally oval-shaped.

19. The table saw of claim 10, wherein the adjustment opening is generally U-shaped.

20. A table saw blade heel adjustment system, comprising:
    a trunnion for supporting a table saw blade assembly relative to a work surface, the trunnion defining an adjustment opening extending therethrough, the adjustment opening defining generally opposing sides; and
    means received by the adjustment opening for moving the trunnion relative to the work surface, resulting in movement of the supported table saw blade assembly.

* * * * *